(12) United States Patent
Indupuru et al.

(10) Patent No.: US 11,747,998 B1
(45) Date of Patent: Sep. 5, 2023

(54) INDEXING TECHNIQUE FOR LARGE SCALE DISTRIBUTED KEY-VALUE SYSTEMS

(71) Applicant: OmniTier Storage, Inc., Milpitas, CA (US)

(72) Inventors: Suneel Indupuru, Cupertino, CA (US); Prasanth Kumar, Fremont, CA (US); Derrick Preston Chu, Santa Clara, CA (US); Daryl Ng, San Jose, CA (US)

(73) Assignee: OmniTier, Inc., San Jose, CA (US)

( * ) Notice: Subject to any disclaimer, the term of this patent is extended or adjusted under 35 U.S.C. 154(b) by 54 days.

(21) Appl. No.: 17/572,051

(22) Filed: Jan. 10, 2022

Related U.S. Application Data

(60) Provisional application No. 63/150,167, filed on Feb. 17, 2021.

(51) Int. Cl.
 *G06F 3/06* (2006.01)
(52) U.S. Cl.
 CPC ............ *G06F 3/0622* (2013.01); *G06F 3/067* (2013.01); *G06F 3/0655* (2013.01)
(58) Field of Classification Search
 None
 See application file for complete search history.

(56) References Cited

U.S. PATENT DOCUMENTS

| | | | | |
|---|---|---|---|---|
| 10,303,382 | B1* | 5/2019 | Chu | G06F 3/0685 |
| 2013/0290643 | A1* | 10/2013 | Lim | G06F 16/24552 |
| | | | | 711/144 |
| 2014/0325012 | A1* | 10/2014 | Guerin | G06F 15/17331 |
| | | | | 709/212 |
| 2016/0054922 | A1 | 2/2016 | Awasthi | |
| 2016/0077980 | A1* | 3/2016 | Tomlin | G06F 16/20 |
| | | | | 711/135 |
| 2016/0224497 | A1 | 8/2016 | Hartman | |
| 2019/0042304 | A1* | 2/2019 | Wang | H04L 47/2441 |
| 2020/0134100 | A1* | 4/2020 | Wils | G06F 16/9027 |

* cited by examiner

*Primary Examiner* — Edward J Dudek, Jr.
*Assistant Examiner* — Ralph A Verderamo, III
(74) *Attorney, Agent, or Firm* — Van Pelt, Yi & James LLP

(57) ABSTRACT

An application and a plurality of types of storage in a distributed storage system are communicated with. A write instruction that includes a key-value pair that in turn includes a key and value is received from the application. The key-value pair is stored in a selected one of the plurality of types of storage where the selected type of storage is selected based at least in part on a size or access frequency of the key-value pair. A link to the stored key-value pair is stored, including by: generating a key hash based at least in part on the key from the key-value pair and selecting one of a plurality of rows in an extensible primary table in an index based at least in part on the key hash. If it is determined there is sufficient space, the link to the stored key-value pair is stored, in the selected row. If it is determined there is insufficient space, the key-value pair is stored in an overflow row in a secondary table.

14 Claims, 12 Drawing Sheets

Nonintegrated

Integrated on Compute Appliance

Example Format of an Entry in a Primary Table

Example Format 1 of an Entry in a Secondary Table

Example Format 2 of an Entry in a Secondary Table

INDEXING TECHNIQUE FOR LARGE SCALE DISTRIBUTED KEY-VALUE SYSTEMS

CROSS REFERENCE TO OTHER APPLICATIONS

This application claims priority to U.S. Provisional Patent Application No. 63/150,167 entitled INDEXING TECHNIQUE FOR LARGE SCALE DISTRIBUTED KEY-VALUE SYSTEMS filed Feb. 17, 2021 which is incorporated herein by reference for all purposes.

BACKGROUND OF THE INVENTION

Distributed caching layers which permit data to be transparently stored on different types of storage (e.g., depending upon the size of the data, how "hot" the data is, metadata associated with the data, and/or other metrics used by a distributed caching layer to select a type of storage for a given piece of data) without a higher-level application (e.g., which sends data to the distributed caching layer for storage) knowing and/or having to support this capability have been developed. Further improvements to distributed caching layers which further improve the performance of the system would be desirable. For example, such improvements may enable more flexible and/or efficient packing of information in allocated storage while still ensuring the integrity of the data. In some cases, the improvements permit a compute appliance (e.g., which includes an application running on a distributed caching layer) to complete processes and/or operations more quickly (i.e., lower latency) because the distributed caching layer can more quickly provide data to the application on the compute appliance. Also, Improvements enable compute applications to service higher number of requests (i.e., higher throughput) thereby improving application performance under load. Other improvements include lower write amplification and garbage collection overhead that in turn makes application responsive and also extends SSD drive life.

BRIEF DESCRIPTION OF THE DRAWINGS

Various embodiments of the invention are disclosed in the following detailed description and the accompanying drawings.

DETAILED DESCRIPTION

Figure 1:
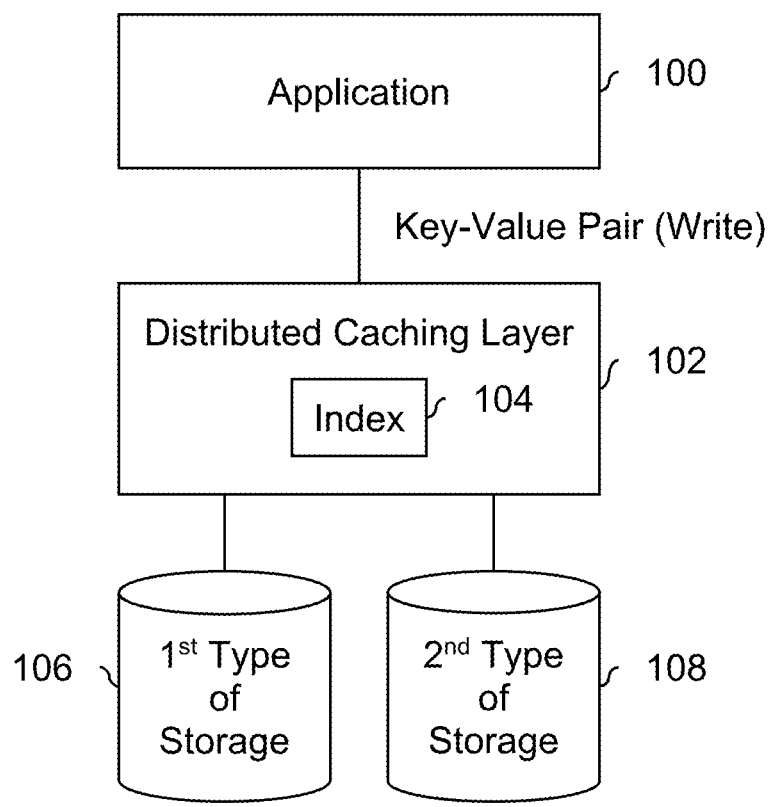
FIG. 1 is a diagram illustrating an embodiment of a distributed caching layer that stores data from an application in multiple types of storage.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of improvements to an index in a distributed caching layer are described herein. Generally speaking, distributed caching layers permit data to be stored in different types of storage in a manner that is transparent to a higher-level application that sends data to the distributed caching layer for storage (e.g., the application does not need to be aware of this feature and/or changes to the application are not required to support this feature). In some embodiments, a write instruction that includes a key-value pair that in turn includes a key and value is received from an application (e.g., at or by a distributed caching layer). The value from the key-value pair is stored (e.g., by the distributed caching layer), at least temporarily, in an index, including by: generating a key hash based at least in part on the key; selecting one of a plurality of rows in an extensible primary table based at least in part on the key hash; in the event there is sufficient space in the selected row, storing, in the selected row, a pointer to a storage location of the value in the index; and in the event there is not sufficient space in the selected row, storing the value associated with the key-value pair in an overflow row in a secondary table. The value from the key-value pair is stored (e.g., by the distributed caching layer) in at least one of a plurality of types of storage in a distributed storage system, including by selecting, based at least in part on the size of the key-value pair, said at least one of the plurality of types of storage. In at least some applications, having an index with extensible (e.g., primary) tables permits a distributed caching layer to more efficiently store entries in the index while still ensuring the integrity of the data (e.g., the correct value is returned during a read for a given key).

It may be helpful to first describe some examples of distributed storage systems which include distributed caching layers and/or indices in such distributed storage systems. The following figures describe some such examples.

FIG. 1 is a diagram illustrating an embodiment of a distributed caching layer that stores data from an application in multiple types of storage. In the example shown, a distributed caching layer (102) communicates with an application (100) and a plurality of types of storage (106 and 108) in a distributed storage system, for example, via a communication interface in the distributed caching layer. The application (100) sends a key-value pair to the distributed caching layer (102) as part of a write operation. A key-value pair includes two elements: (1) a key that is used to later retrieve the stored or written data from the distributed caching layer and (2) the value which is the data that is stored by the distributed caching layer and which may be later retrieved using the key.

In this example, the distributed caching layer (102) selects between a first type of storage (106) and a second type of storage (108) in a distributed storage system (e.g., the two types of storage are located at different parts of the network and/or comprise different storage protocols or paradigms such as filed-based versus object-based or cloud storage versus self-managed and/or fixed physical storage systems) and stores the value from the key-value pair in the selected type of storage. In some embodiments, the different types of storage (106 and 108) are in a distributed system where storage is distributed across a variety of locations such as on the appliance or device, on premise, on the cloud, etc. and/or where each type of storage corresponds to a different storage tier. The distributed caching layer provides a single interface for the application; this makes the different types of storage, distributed nature of the storage, and/or different storage tiers transparent to the application. Although two types of storage are shown in this example, this number is merely exemplary and any number and/or types of storage may be managed by the distributed caching layer.

The distributed caching layer (102) manages an index (104) which is used to store a subset of the key-value pairs that the distributed caching layer (102) is responsible for. For example, the most recent key-value pairs that have been read or written may be in the index. As will be described in more detail below, the key-value pairs are stored in the index by generating a key hash from the key in a key-value pair using a hash function. In some embodiments, the key hash (or some portion of it) is used to determine if a particular key and its associated value are stored in the index. To prevent an incorrect value from being returned for a key in some cases, the index has extensible (e.g., primary and/or secondary) tables. For example, if the number of key hashes that map to the same entry or row in a primary table in the index reaches some maximum (e.g., the row only has one entry or column left), a reference, pointer, or link is added to that last spot to a (row in a) secondary table which stores information for (e.g., pointers to) additional key-value pairs. Examples of extensible tables in the index and/or other index features (e.g., locking) are described in more detail below.

A benefit associated with using an index with extensible tables is that entries in the index can be more efficiently stored (e.g., tables expand as needed) while ensuring the integrity of the data (e.g., without extensible tables, some entries in a given row would be overwritten and the correct value for the corresponding key might not be returned during a read). Other indices which are implemented more naively without extensible tables, for example, may be undesirably large and/or less flexible, especially when dealing with very large datasets (e.g., genome-related datasets).

In some embodiments, a distributed caching layer (e.g., 102) selects a type of storage onto which data (e.g., a value from a key-value pair) is stored by receiving data to be stored (e.g., a value from a key-value pair) from an application (e.g., 100). A selection is made between a first type of storage having a first set of storage properties and a second type of storage having a second set of storage properties based at least in part on an access characteristic associated with the data, the first set of storage properties, and the second set of storage properties. Selecting includes: receiving a write address, associated with the data to be stored, from the application; determining a write count which corresponds to the write address; and/or determining if the write count exceeds a temperature threshold. In the event it is determined that the write count exceeds the temperature threshold, selecting the first type of storage, wherein the first type of storage is more durable than the second type of storage. In the event it is determined that the write count does not exceed the temperature threshold, selecting the second type of storage. The data is stored in the selected type of storage.

For example, suppose the first type of storage (106) comprises DRAM storage (e.g., accessible via a DDR interface) and the second type of storage (108) comprises solid state drive (SSD) storage (sometimes referred to as Flash storage). SSD storage, unlike other types of storage, "wears out" with each program (i.e., write) or erase operation. Generally speaking, the act of programming or erasing is very stressful to solid state storage cells and causes the electrical insulation of the solid state storage cells to break down a little bit each time a program or erase occurs. This makes SSD storage that has been programmed and/or erased a relatively large number of times (i.e., "older" storage) "leaky" with respect to any stored electrical charge. Since information is stored in the form of charge in SSD storage, older SSD storage will tend to have poor long-term retention performance compared to new SSD storage. As such, excessive programming and erasing of solid state storage is undesirable. DDR storage does not have this issue and can be programmed and erased as many times as desired.

In some embodiments, the type of storage is selected and data is migrated, transferred, and/or otherwise flushed (if needed) to the selected type of storage during a read operation as opposed to a write operation. Using a read to trigger a reassessment of a type of storage to use relies upon the observation that reads do not necessarily match or correspond to writes. For example, the data being read may include data that is written over multiple write instructions (e.g., data X is written using a first write instruction, data Y is subsequently written using a second write instruction, and then data (X and Y) are read in a single read instruction). Or, the data being read may be a subset of the data that was written together or at the same time. For example, data (X and Y) may be written with a single write instruction and then data X (but not data Y) is read.

In some embodiments where selection of a type of storage is triggered by and/or based on a read, a distributed caching layer (e.g., 102) selects a type of storage onto which data (e.g., a value from a key-value pair) is stored by receiving data to be stored (e.g., a value from a key-value pair) from an application (e.g., 100). A selection is made between a first type of storage having a first set of storage properties and a second type of storage having a second set of storage properties, based at least in part on an access characteristic associated with the data, the first set of storage properties, and the second set of storage properties, where selecting includes: selecting, from a plurality of key-value pair size groups, a key-value pair size group corresponding to a key-value pair size associated with a read instruction and selecting that type of storage which corresponds to the selected key-value pair size group. The data is (then) stored in the selected type of storage.

As an example of this, a type of storage to initially store the data (e.g., during a write) may be selected using any technique (e.g., assign to the most abundant and/or cheapest type of storage, one of the techniques described above, etc.). When a read is performed, the amount of data being read is compared against thresholds (e.g., $thr_1$ and $thr_2$) in order to determine the corresponding key-value pair size group (e.g., a small group, a medium group, or a large group). For example, if the amount of data being read falls between $thr_1$ and $thr_2$, then the read corresponds to the medium group (e.g., a medium amount of read data). The read data is then moved, if needed, to the type of storage which corresponds to that group.

In another read-triggered and/or read-related example, in some embodiments, a distributed caching layer (e.g., 102) selects a type of storage onto which data (e.g., a value from a key-value pair) is stored by receiving data to be stored from an application (e.g., 100). A selection is made between a first type of storage having a first set of storage properties and a second type of storage having a second set of storage properties based at least in part on an access characteristic associated with the data, the first set of storage properties, and the second set of storage properties. Selecting includes receiving a read address associated with a read instruction, determining a read count which corresponds to the read address, and selecting, from a plurality of read count groups, a read count group corresponding to the determined read count. The type of storage that corresponds to the selected read count group is selected and the data is stored in the selected type of storage.

For example, as described above, data may be initially stored in some type of storage (e.g., assigned to a default, assigned using some selection process, etc.). When a read occurs, the read count (or, alternatively, frequency) corresponding to the key being read is determined. For example, the distributed caching layer may manage an activity table to track keys and corresponding read counts. The read count is then used to determine the appropriate read count group (e.g., based on ranges or thresholds which define the boundaries of the read count groups).

The following figure shows an example of a compute appliance which includes an application and a distributed caching layer.

Figure 2A:
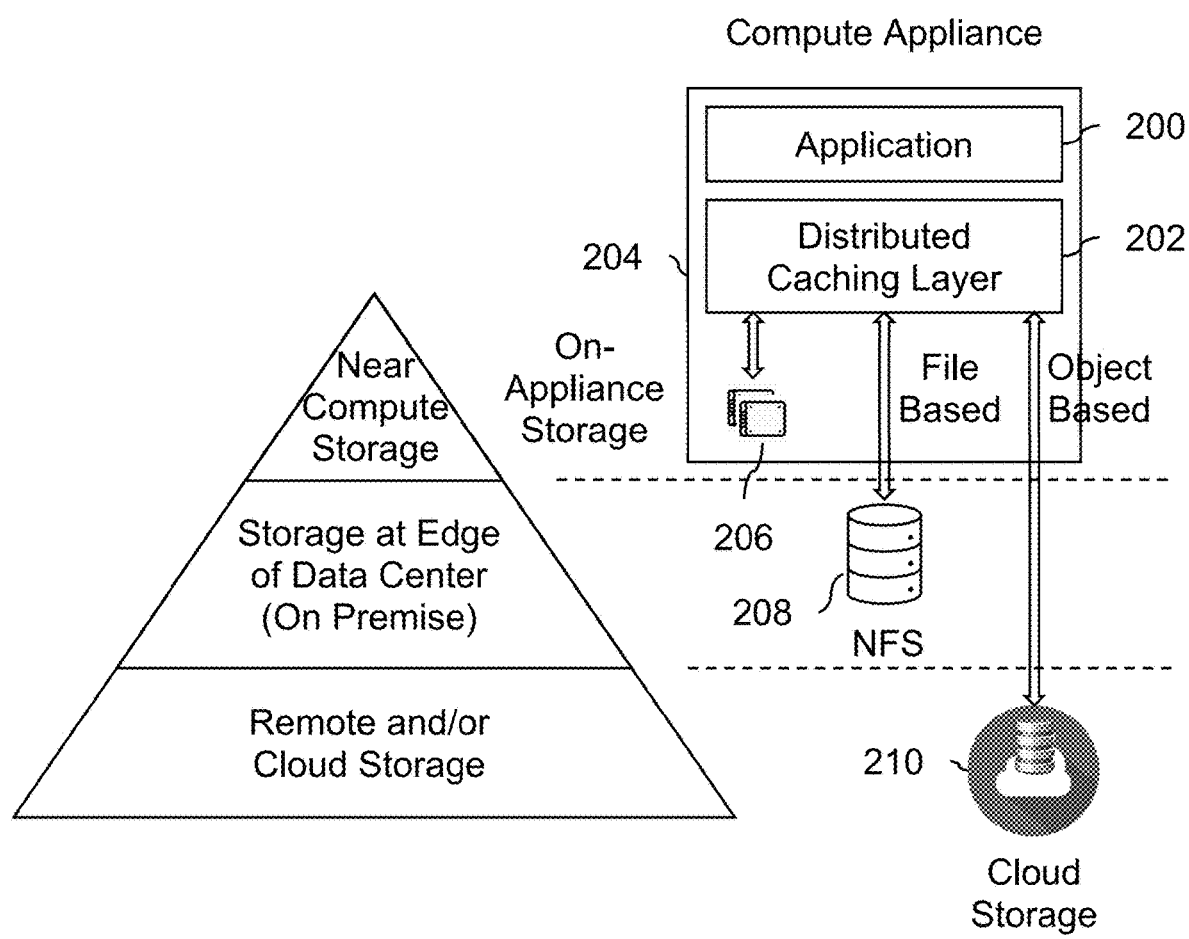
FIG. 2A is a diagram illustrating an embodiment of a compute appliance which includes an application and a distributed caching layer.

FIG. 2A is a diagram illustrating an embodiment of a compute appliance which includes an application and a distributed caching layer. In the example shown here, an application (200) and a distributed caching layer (202) are co-located on a compute appliance (204). For example, the application (200) may include specialized computing processes, tools, and/or services directed to a specific use case or industry, such as analyzing, rendering, associating, interpreting, or otherwise processing genome-related data. In one such example, the application (200) performs secondary analysis, such as ingesting a sequenced DNA file associated with a patient as well as a reference DNA sequence (e.g., each of which may be 200 GB or larger) and generating a list or set of DNA variants between the reference DNA sequence and sequenced DNA file. In some embodiments, the application (200) performs genome-related tertiary analysis, such as inputting a list of DNA variants, associated with patient information, performing statistical analysis and/or processing, rendering genome-related data or associated data, etc. In various embodiments, the application (200) and the distributed caching layer (202) are implemented in a variety of software and/or hardware forms (e.g., a field-programmable gate array (FPGA), an application-specific integrated circuit (ASIC), etc.).

The usage of multiple and/or different types of storage and selection of a particular type of storage is managed by the distributed caching layer (202) and is transparent to the application (200). This, for example, enables the application to focus on its specialized processing and/or services and not worry about selecting a best type of storage to use. Instead, the distributed caching layer (202) manages across distributed (types of) storage which in this example comprises on-appliance storage (206), network file system (NFS) storage (208) which is file-based storage, and cloud storage (210) which is object-based storage. Conceptually, each of type of storage is associated with a corresponding tier of storage: the on-appliance storage (206) corresponds to the top-tier, near compute storage; the NFS storage (208) corresponds to the mid-tier storage at the edge of a data center (and/or on-premise storage); and the cloud storage (210) corresponds to the bottom-tier remote and/or cloud storage.

On the storage-facing side of the distributed caching layer (202), compute appliance (204), the exemplary compute appliance (204) manages the storage of key-value pairs in the exemplary storage tiers shown here. At set up and/or installation of the compute appliance (204), the compute appliance is connected to the appropriate network(s) and provided with the appropriate paths, locations, and/or access credentials in order to discover and access the NFS storage (208) and cloud storage (210) (it is assumed the compute appliance is already aware of and has access to the on-appliance storage (206)). As new data is received to be stored (e.g., a new sequenced DNA file is received for which a list of DNA variants is generated (relative to a reference DNA sequence), the distributed caching layer (202) selects one of the types of storage (e.g., based on metadata and/or metrics associated with a given key-value pair) and stores key-value pairs accordingly.

In some cases, the NFS storage (208) and cloud storage (210) may already have existing data stored thereon when the compute appliance is installed (204). In some such embodiments, instead of actively combing through the NFS storage (208) and cloud storage (210) to assess the older data stored thereon (e.g., by some other application or system), the distributed caching layer may passively wait until such older data is read to re-assess whether that data is stored in an appropriate type and/or tier of storage. (As described above, a variety of read-triggered and/or read-based techniques to select storage may be performed by the distributed caching layer.) This passive approach may be desirable in some applications because it does not consume resources (e.g., power, I/O access, network bandwidth, etc.) which would otherwise be consumed if the distributed caching layer attempted to actively discover and rearrange older data without being prompted.

Implementing a distributed caching layer on a compute appliance where the application is known and/or limited to a specific application (as opposed to a distributed caching layer that has to support a variety of applications some of which may not be known ahead of time) may be desirable and/or beneficial for a number of reasons. For example, since the developer and/or provider of the compute appliance has control over both the application and the distributed caching layer, those interfaces can be developed and/or configured to share detailed information (e.g., metadata) which improves the storage of key-value pairs and/or the retrieval of stored key-value pairs. For example, the distributed caching layer (202) is able to have detailed knowledge of what process the co-located application (200) is running and/or what stage the process is in and can pre-populate the on-appliance storage (206) and/or NFS storage (208) with appropriate data to reduce data access and/or retrieval times. Such pre-population would not be possible if the distributed caching layer had to service (for example) a wide variety of applications instead of a single application with a specific set of operations.

Another benefit is that integration (e.g., of a new system or service) may be less of a concern and/or more compelling when the distributed caching layer is implemented on a compute appliance. For example, with a stand-alone distributed caching layer, it may be difficult to exhaustively demonstrate that a (new) distributed caching layer can be seamlessly integrated into existing infrastructure with existing applications without actually installing the distributed caching layer. With a compute appliance, because the (new) application and (new) distributed caching layer come pre-packaged together and have been thoroughly tested during development, there is less of a concern about interoperability issues between those two blocks or components.

The following figures illustrate more specific examples of compute appliances. In the first example, the compute appliance performs genome-related secondary analysis. In the second example, the compute appliance performs genome-related tertiary analysis.

Figure 2B:
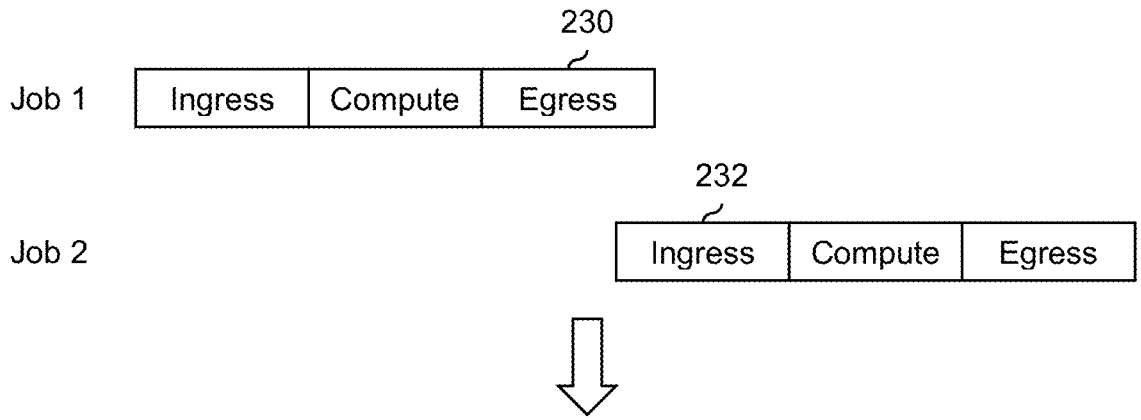
FIG. 2B is a diagram illustrating an embodiment of components that are associated with a compute appliance that performs genome-related secondary analysis.
Figure 2B:
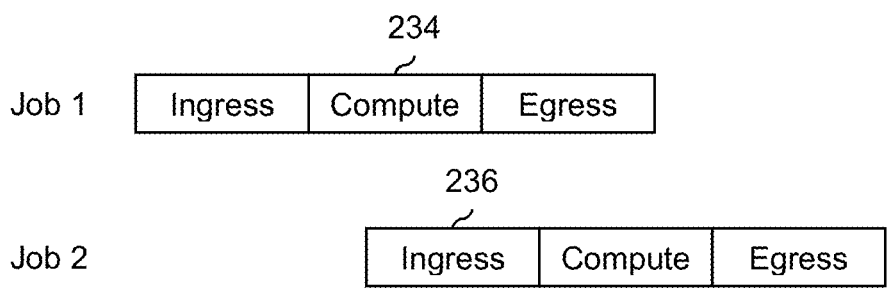
Figure 2B:
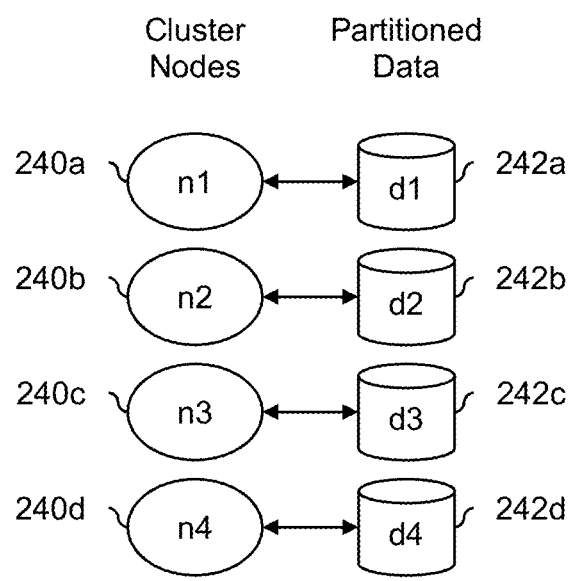

FIG. 2B is a diagram illustrating an embodiment of components that are associated with a compute appliance that performs genome-related secondary analysis. In this example, a compute appliance (see, e.g., FIG. 2A) performs whole genome and/or exome sequencing with a scalable number of cluster nodes (e.g., where in some embodiments compute appliance consist of one more cluster nodes). For example, a genome-related secondary analysis compute appliance may include preprocessing followed by somatic pipeline, and/or germline pipeline performed in parallel to produce a list of DNA variants; and/or the list of DNA variants is produced by preprocessing followed by de novo assembly.

When two genome-related secondary analysis jobs that are related are performed using a nonintegrated application and distributed caching layer (e.g., they are not implemented as a compute appliance), the ingress stage of the second job (232) is not able to begin until the egress stage of the first job (230). In contrast, on a compute appliance where the application and distributed caching layer are integrated, integrated data pipelining is able to be implemented so that the ingress stage of the second job (236) is able to start during the compute stage for the first job (234). As shown here, this permits the two jobs in the latter integrated, compute appliance example to complete faster than in the nonintegrated example.

A compute appliance embodiment also permits data to be partitioned in a more efficient manner that corresponds to the number of cluster nodes. For example, each of the four partitioned data (242a-242d) contains the appropriate and/or corresponding data used by one of the four cluster nodes (240a). This improves the efficiency of networking and/or ingress/egress resources, for example, because only one cluster node is accessing each set of partitioned data. The first set of partitioned data (242a), for example, only needs to service the first cluster node (240a), as opposed to all four of the cluster nodes (240a-240d) which would slow down performance.

Figure 2C:
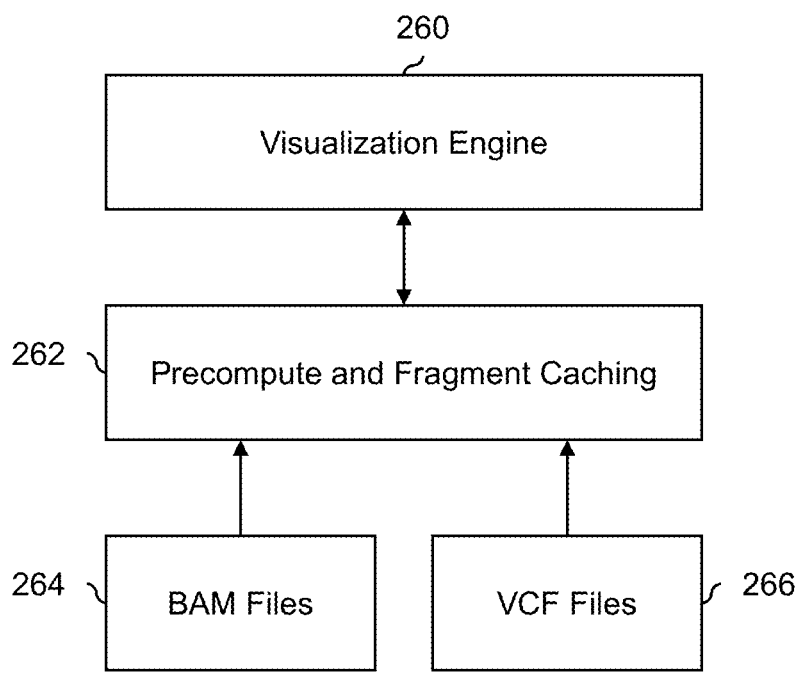
FIG. 2C is a diagram illustrating an embodiment of components that are associated with a compute appliance that performs genome-related tertiary analysis.

FIG. 2C is a diagram illustrating an embodiment of components that are associated with a compute appliance that performs genome-related tertiary analysis. In this example, a compute appliance (see, e.g., FIG. 2A) renders or otherwise displays visual results and/or interpretations using variant knowledge databases and gene databases. For example, this may include performing known disease and/or biological effects analysis, querying and filtering, performing (e.g., machine learning-based) variant prioritization, and then interpretation and visualization.

In this example, sequence data in BAM files (264) and gene sequence variations (e.g., relative to a reference genome) in VCF files (266) are input by a precompute and fragment caching block (262) that precomputes and stores analysis data and/or fragments which in turn are used by a visualization engine (260) to display visualizations of results and/or interpretations. Without an integrated application and distributed caching layer (e.g., which is supported on a compute appliance), analysis data would not be able to be precomputed; without precomputed analysis data, the time to render a visualization would increase. This is similar to FIG. 2B where the two jobs are able to be performed more quickly due to the integrated data pipelining.

Returning briefly to FIG. 1, it is noted that a key-value pair is exchanged between the application (100) and distributed caching layer (102). The benefit of exchanging key-value pairs, as opposed to packaged blocks (e.g., made up of values from different key-value pairs), is described in more detail below.

Figure 3:
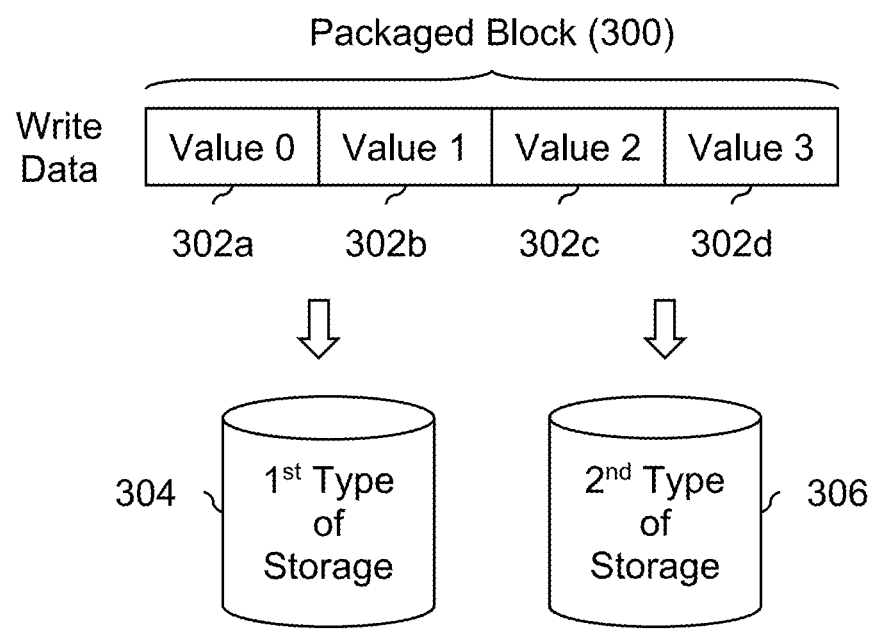
FIG. 3 is a diagram illustrating an embodiment of a packaged block comprising values associated with key-value pairs.

FIG. 3 is a diagram illustrating an embodiment of a packaged block comprising values associated with key-value pairs. In some other systems, applications send write data to an underlying storage and/or caching layer in the form of packaged blocks (e.g., the exemplary block (300) shown here) having a specific size instead of in the form of key-value pairs (e.g., as in FIG. 1) which have varying sizes. For example, the size of the exemplary block (300) may match the size that data is written to physical and/or Flash storage. In this example, there are four values (302a-302d) in the exemplary block (300), where the size of each value is smaller than the size of the exemplary block and therefore the four values are appended together or otherwise packaged together to form the block shown here. For example, the values (302a-302d) may be the end chunks or portions of data to be stored that did not fit neatly into a block; these leftover end chunks or portions are consolidated into a single block.

However, if an application (pre-)packages values into fixed-size blocks as shown here, some of the values may get grouped with other values that have different optimal and/or preferred types of storage (e.g., as determined by the distributed caching layer). For example, the first two values (302a and 302b) may come from relatively large pieces of data (e.g., on the order of hundreds of gigabytes) where a distributed caching layer (e.g., 102 in FIG. 1) would want to store them on a first type of storage (304), such as cloud storage that is appropriate for that amount of data (e.g., has sufficient capacity and/or is cost-effective). Other types of storage, such as Network File System (NFS) and/or on-premise storage, may be insufficient to store such large amounts of data in the long term and it may be inefficient and/or resource-intensive to have to later migrate or flush the data to more appropriate types of storage.

In contrast, the third and fourth values (302c and 302d) may come from smaller pieces of data (e.g., on the order of a single gigabyte or hundreds of megabytes) where a distributed caching layer (e.g., 102 in FIG. 1) would want to store them on a second type of storage (306), such as Network File System (NFS) and/or on-premise storage that is appropriate for that amount of data to be stored. By permitting an application to package values into blocks as shown here, this prohibits a distributed caching layer from storing data in the desired and/or preferred type of storage, which in turn may affect the performance of the system (e.g., slowing down the retrieval time of data that is not optimally stored).

To that end, in the example shown in FIG. 1, the application (100) and distributed caching layer (102) are configured to exchanging data in their "rawer" form (e.g., key-value pairs) as opposed to blocks that are packaged by the application. This permits a distributed caching layer (102) to be able to store data on types of storage that it deems best and/or optimal, which in turn improves the overall performance of the system (e.g., results in lower read response times and/or avoids the need to subsequently migrate or flush data to some other type of storage).

The following figure illustrates an embodiment of an index which includes a primary table and a secondary table.

Figure 4:
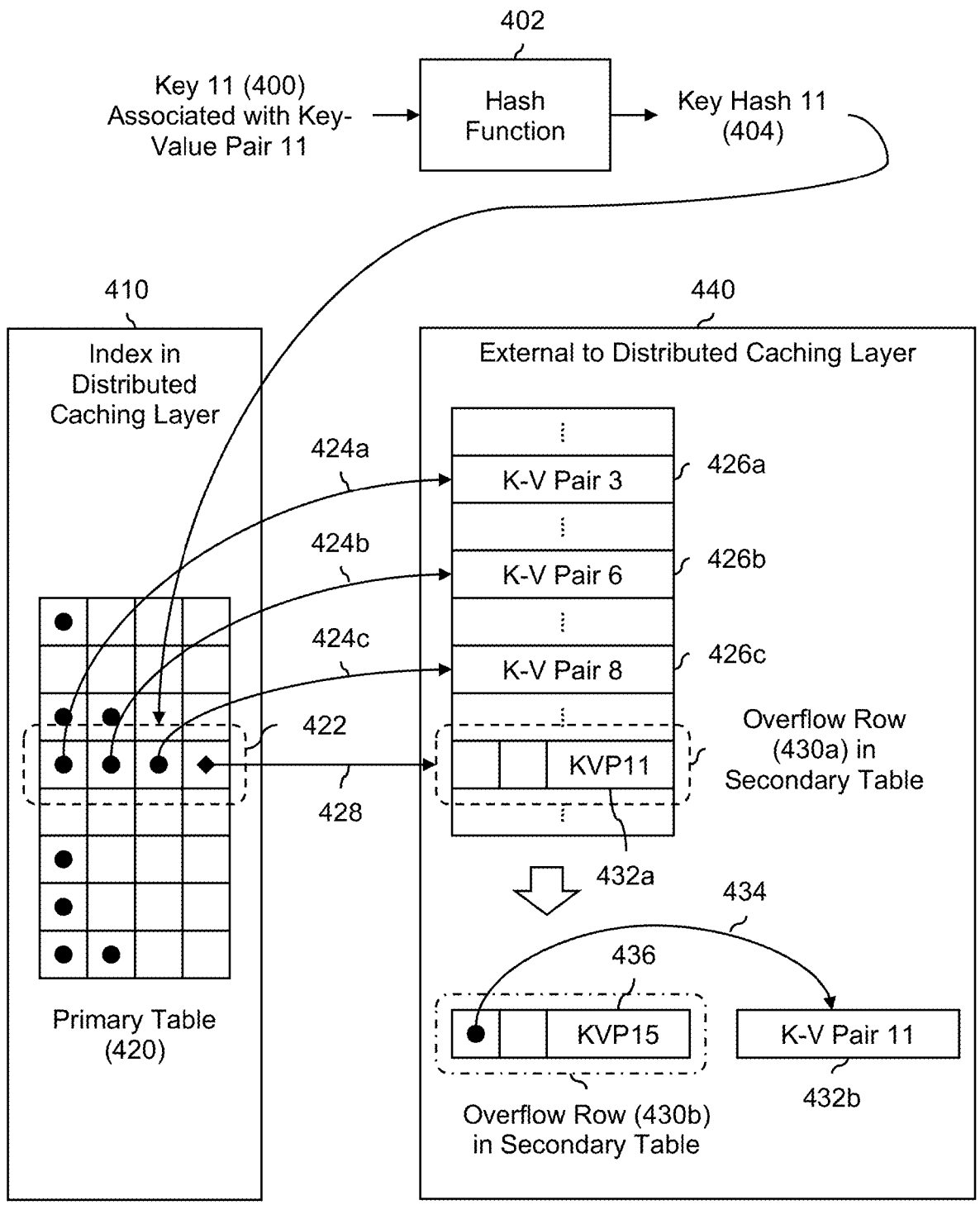
FIG. 4 is a diagram illustrating an embodiment of an index which includes an extensible primary table.

FIG. 4 is a diagram illustrating an embodiment of an index which includes an extensible primary table. In this example, 10 key-value pairs are already managed by the exemplary index (410) and an $11^{th}$ key-value pair is in the process of being stored by the system. For example, the $11^{th}$ key-value pair (i.e., key-value pair 11) may have been received at a distributed caching layer (e.g., 102 in FIG. 1 or 202 in FIG. 2A) from an application (e.g., 100 in FIG. 1 or 200 in FIG. 2A) as part of a write instruction. Key 11 (400) is extracted from key-value pair 11 by a distributed caching layer (not shown) and is passed to a hash function (402), (e.g., in the distributed caching layer) in order to generate key hash 11 (404). It is noted that the arrangement of elements shown here is merely exemplary and is not intended to be limiting in how the elements are (e.g., physically) stored. For example, the rows which comprise the index (410) do not necessarily need to be (e.g., physically) adjacent to each other in storage.

In this example, key hash 11 (404) maps to or otherwise points to the fourth row (422) in the primary table (420) in the index (410) because the lowest three bits of the key hash 11 have a value (e.g., 3) that is associated with that row. There are eight rows in the primary table (420) and so the lowest three bits are used to determine which row in the primary table a particular key hash maps to. The fourth row (422) in the primary table already contains three pointers (424a-424c) to other key-value pairs (426a-426c) that are already stored external to the distributed caching layer (440). For example, in FIG. 1, key-value pairs (426a-426c), this storage external to the distributed caching layer (440), may comprise the first type of storage (106) and/or the second type of storage (108). In the example of FIG. 2A, this storage external to the distributed caching layer (440) may comprise the on-appliance storage (206), NFS storage (208), and/or cloud storage (210). To preserve the readability of the figure, some of the key-value pairs that have already been processed and/or stored by the system (as well as the links from the pointers in the primary table to those key-value pairs that are already stored) are not shown.

The primary table (420) in this example has four bins or groups, represented by the four columns in the primary table. This number of bins is configurable. If the primary table in the index were not extensible, then the number of bins would limit the number of key hashes which could map to a given row (e.g., 422) in the primary table while still ensuring data integrity. For example, in a non-extensible primary table (not shown), if five key hashes pointed to the same row, then the wrong value would be returned for one of the five key (hashes) if read because there is not enough space for all five pointers to be stored and so an incorrect value would be returned or not found for one of the five key (hashes).

However, because the exemplary primary table shown here is extensible, it is possible to have five or more key hashes reference the same row (e.g., 422) in the primary table (420). In response to the new key hash 11 (404), a pointer (428) is added to the last available bin or column in the fourth row (422) of the primary table; this pointer (428) points to an overflow row (430a) in a secondary table, which is stored with the key-value pairs (426a-426c, 432a/432b, and 436) external to the distributed caching layer (440). To preserve the readability of the figure, only one overflow row in the secondary table is shown; in some embodiments, the secondary table includes a plurality of overflow rows (i.e., the secondary table and/or other lower-level tables can be extensible). Similarly, in some embodiments, multiple rows in the primary table point to (e.g., different) overflow rows in the secondary table.

In this example, the system is configured to include the most recent key-value pair in the overflow row and therefore key-value pair 11 (432a) is stored in the overflow row (430a). It is noted that the overflow row (430a) does not contain a pointer or link to key-value pair 11 (at least in the state shown here) since reading or accessing the overflow row (430a) would also return key-value pair 11.

Overflow row (430b) shows the state of the overflow row after another key-value pair is received that maps to or is otherwise associated with the exemplary overflow row. Since key-value pair 11 is no longer the most recent key-value pair for the overflow row, key-value pair 11 is stored elsewhere (432b) outside of the overflow row (430b) and a new pointer or link (434) to the stored key-value pair 11 (432b) is added to the overflow row (430b). The newly received key-value pair 15 (436) is stored in the overflow row (430b) since it is now the most recent key-value pair associated with the exemplary overflow row. As described above, no pointer to key-value pair 15 (436) is added to the overflow row (430b).

This process continues and tables are created and/or extended as/if needed. For example, the later version of the overflow row (430*b*) only has one open entry left and so if another key-value pair were to be mapped to the overflow row (430*b*), a pointer or link to another overflow row (not shown) would be added to the last available entry in the overflow row (430*b*).

In some embodiments, an overflow row (e.g., 430*a*/430*b*) and any associated key-value pairs (e.g., key-value pair 432*a* or 436) can be read back in a single read operation. For example, the exemplary overflow row (430*a*/430*b*) may be stored on solid state storage and the width of the overflow row matches the width of a single read. Thus, when the overflow row (430*b*) is retrieved, this may minimize the consumption of computing and/or network resources (e.g., I/O availability, network bandwidth, etc.) since the desired key-value pair may be the most recent key-value pair and is therefore already included when the overflow row is read.

Returning briefly to FIG. 1, by implementing an index (104) that includes extensible (e.g., primary) tables, the distributed caching layer (102) may be able to quickly perform reads using key-value pairs that are stored in the index while flexibly and/or efficiently storing information (e.g., entries) in the index.

The following figure describes this example more generally and/or formally in a flowchart.

Figure 5:
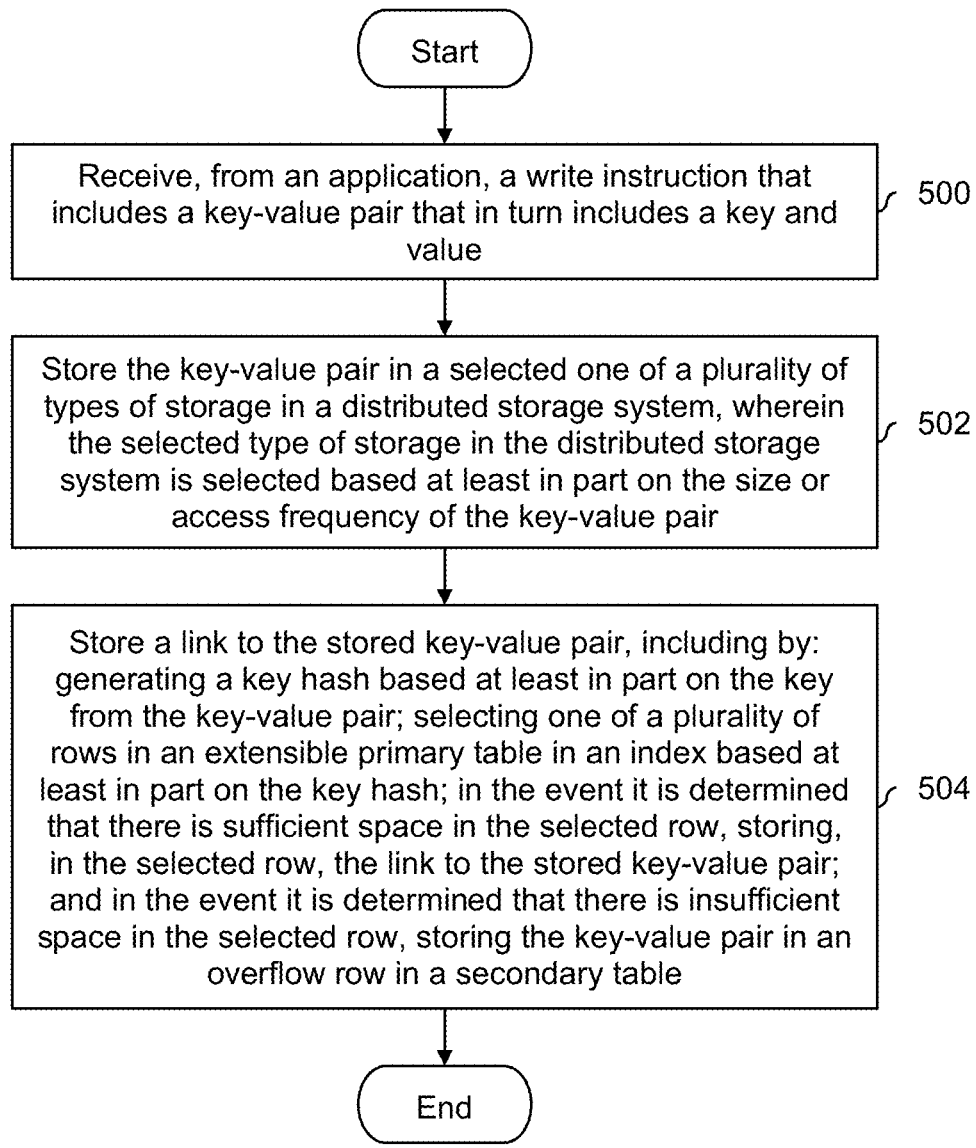
FIG. 5 is a flowchart illustrating an embodiment of a write process to store a key-value pair in a distributed storage system, including by using an index with an extensible primary table.

FIG. 5 is a flowchart illustrating an embodiment of a write process to store a key-value pair in a distributed storage system, including by using an index with an extensible primary table. For example, the process may be performed by the distributed caching layer (102) in FIG. 1 or the distributed caching layer (202) in FIG. 2A.

At 500, a write instruction that includes a key-value pair that in turn includes a key and value is received from an application. In some examples described herein, the application performs secondary or genome-related tertiary analysis and the values associated with key-value pairs include (as an example): intermediate and/or temporal data values or outputs from the secondary or genome-related tertiary analysis, such as a list or set of DNA variants.

At 502, the key-value pair is stored in a selected one of a plurality of types of storage in a distributed storage system, wherein the selected type of storage in the distributed storage system is selected based on either size or access frequency of the key-value pair. In the example system of FIG. 2A, a key-value pair may be stored in on-appliance storage (206) (e.g., if the key-value pair is relatively small), on NFS storage (208) (e.g., if the key-value pair is somewhat larger), or on cloud storage (210) (e.g., if the key-value pair is relatively large).

At 504, a link to the stored key-value pair is stored (e.g., in the index), including by: generating a key hash based at least in part on the key from the key-value pair; selecting one of a plurality of rows in an extensible primary table in an index based at least in part on the key hash; in the event it is determined that there is sufficient space in the selected row, storing, in the selected row, the link to the stored key-value pair; and in the event it is determined that there is insufficient space in the selected row, storing the key-value pair in an overflow row in a secondary table.

In FIG. 4, for example, the storage of key-value pair 11 (432*a*) in the overflow row (430*a*) on storage that is external to the distributed caching layer (440) is one example of step 502; the storage of key-value pair 11 (432*a*) in the overflow row (430*a*) is one example of step 504. In this example, there is insufficient space in the fourth row (422) of the primary table (420) when key-value pair 11 is being stored, so the key-value pair 11 (432*a*) is stored (e.g., directly) in the overflow row (430*a*).

To illustrate how a distributed storage system may be improved by this exemplary process, suppose that the process of FIG. 5 is performed by a compute appliance (see, e.g., FIG. 2A) which performs genome-related tertiary analysis in a distributed storage system, including taking in a list of ~4 million DNA variants and reducing the list to hundreds of DNA variants that are of interest. Even with such a large number of DNA variants, the index is able to manage and/or track all of the associated key-value pairs because the tables in the index can expand and is therefore not limited by the amount of storage that is locally available to the distributed caching layer since the distributed caching layer can store overflow rows and/or a secondary table elsewhere in the distributed storage system.

The following figure shows an example of a read process which may be used in combination with the exemplary write process described in FIG. 5.

Figure 6:
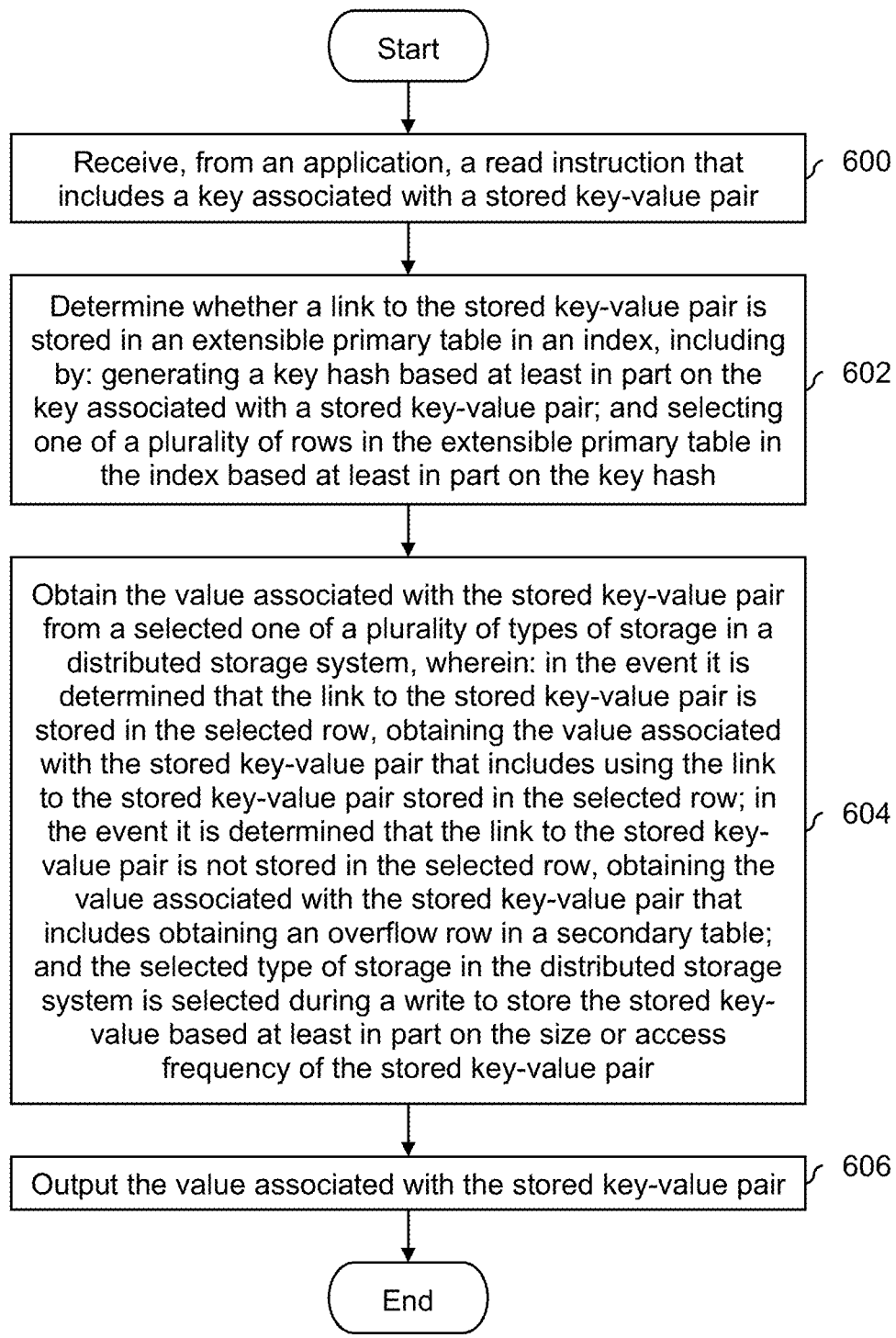
FIG. 6 is a flowchart illustrating an embodiment of a process to read a key-value pair from a distributed storage system, including by using an index with an extensible primary table.

FIG. 6 is a flowchart illustrating an embodiment of a process to read a key-value pair from a distributed storage system, including by using an index with an extensible primary table. For example, the process may be performed by the distributed caching layer (102) in FIG. 1 or the distributed caching layer (202) in FIG. 2A.

At 600, a read instruction that includes a key associated with a stored key-value pair is received from an application. For example, application 100 in FIG. 1 or application 200 in FIG. 2A may send a read instruction to distributed caching layer 102 in FIG. 1 or distributed caching layer 202 in FIG. 2A, respectively, that includes a key for which the corresponding value is desired.

At 602, it is determined whether a link to the stored key-value pair is stored in an extensible primary table in an index, including by: generating a key hash based at least in part on the key associated with a stored key-value pair; and selecting one of a plurality of rows in the extensible primary table in the index based at least in part on the key hash. For example, similar to what is shown in FIG. 4, the received key may be used to generate a key hash and some portion of the key hash (e.g., the lowest 3 bits) is used to select a row (e.g., the fourth row (422) in FIG. 4).

At 604, the value associated with the stored key-value pair is obtained from a selected one of a plurality of types of storage in a distributed storage system, wherein: in the event it is determined that the link to the stored key-value pair is stored in the selected row, obtaining the value associated with the stored key-value pair that includes using the link to the stored key-value pair stored in the selected row; in the event it is determined that the link to the stored key-value pair is not stored in the selected row, obtaining the value associated with the stored key-value pair that includes obtaining an overflow row in a secondary table; and the selected type of storage in the distributed storage system is selected during a write to store the stored key-value based at least in part on the size or access frequency of the stored key-value pair.

For example, in FIG. 4, if key-value pair 3 (426*a*), key-value pair 6 (426*b*), or key-value pair 8 (426*c*) is desired, those links are stored in the primary table and are used to obtain those key-value pairs. In contrast, for key-value pair 11 (432*a*/432*b*), the overflow row in a secondary table (430*a*/430*b*) is used because the key-value pair is stored directly therein (in this example, key-value pair 11 (432*a*) in overflow row (430*a*)) or because the overflow row has a link to the stored key-value pair (in this example, the link (434) to key-value pair 11 (432*b*) stored in the overflow row (430*b*).

At 606, the value associated with the stored key-value pair is output. For example, the distributed caching layer (102) in FIG. 1 or the distributed caching layer (202) in FIG. 2A may pass the value to the application (100) in FIG. 1 or the application (200) in FIG. 2A, respectively.

In some embodiments, selecting one of the plurality of rows in the extensible primary table (e.g., at step 502 in FIG. 5 and/or at step 602 in FIG. 6) further includes using a (first) subsequence of bits, having a value, from the key hash to select a corresponding one of a plurality of rows in an extensible primary table that corresponds to the value of the (first) subsequence of bits. For example, in FIG. 4, the (first) subsequence of bits comprises the three lowest bits from the key hash. Using a (first) subsequence of bits in the key hash to select a row instead of the entire key hash may be desirable (at least in some applications) because it reduces the size (e.g., the height) of the primary table so that instead of having a larger (e.g., taller) primary table that is more sparsely populated, a smaller but more densely populated primary table is used. If a row in the primary table becomes full (or is nearly full), then additional entries may be stored in an overflow row in a secondary table that is referenced or linked to that row in the primary table. This may be a more efficient use of storage resources.

In some embodiments, it is determined that there is insufficient space in the selected row (e.g., at 502 in FIG. 5 during a write operation) if there is only one remaining entry in the selected row, wherein a second pointer to the overflow row in the secondary table is stored in said only one remaining entry in the selected row. For example, an alternative to this is to use a last remaining entry to store a pointer to a key-value pair (e.g., similar to pointers 424a-424c in FIG. 4) but then that pointer to the key-value pair would need to be moved once the next key-value pair is received at that row and replaced with a (second) pointer to the overflow row in the secondary table. This is inefficient (e.g., for any type of storage medium) and for those applications where the primary table is stored in solid state storage, the solid state storage medium may be slowly damaged with each program or erase (e.g., so unnecessary and/or extra program and erase operations are undesirable).

Returning briefly to FIG. 4, various fields of information may be stored in each entry in a primary table and/or a second table (e.g., in addition to pointers to stored key-value pairs or pointers to overflow rows). The following figures describe various examples of formats for entries in a primary table or a secondary table.

Figure 7A:
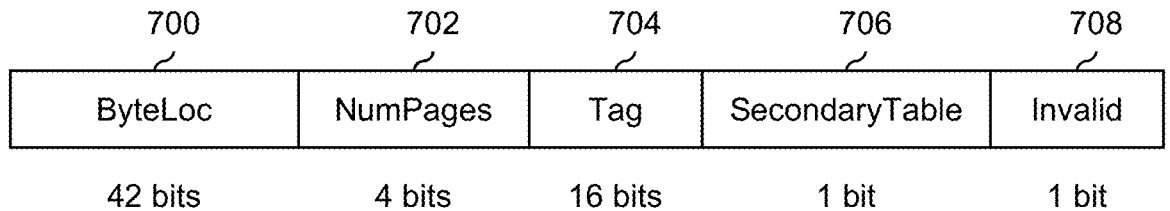
FIG. 7A is a diagram illustrating an embodiment of the format of an entry in a primary table.

FIG. 7A is a diagram illustrating an embodiment of the format of an entry in a primary table. In FIG. 4, for example, the primary table row (422) may include four such entries. It is noted that the bit lengths of each field are merely exemplary and may be adjusted depending upon the particular application and/or desired configuration.

In this example, the ByteLoc field (700) is a 42-bit field that contains the pointer (address) to a corresponding stored key-value pair. In FIG. 4, for example, the pointers (424a-424c) to the stored key-value pairs (426a-426c), as well as the pointer (428) to the overflow row (430a) would be stored in the ByteLoc field (700). The 42 bits in this field permit $2^{42}$ or approximately $4.4 \times 10^{12}$ unique pointers.

As described above, key-value pairs do not have a fixed length and so NumPages field (702) is a 4-bit field encodes how many pages to read at the pointer address or location specified by the ByteLoc field (700). For example, key-value pair 3 (426a) and key-value pair 6 (426b) in FIG. 4 may have different lengths and those lengths (in pages) are stored in their respective NumPages field.

Tag (704) is a 16-bit field comprising the upper 16-bit of the (e.g., associated) key hash. In the example of FIG. 4, the lowest three bits were used to determine which row in the primary table (e.g., fourth row (422)) a particular key hash mapped to. Therefore, since all of the key hashes in the fourth row (422) as well as those in the associated overflow row (430a/430b) have the same lowest three bits, the other (e.g., upper) bits are stored in the tag field (704). During a read, the distributed caching layer compares the upper 16 bits of the key hash being read against the stored tag (704) in order to determine whether it should use the information from this entry to perform the read.

The SecondaryTable field (706) is a 1-bit field that indicates whether this entry points to an overflow row in a secondary table. In FIG. 4, for example, this field would be 0 or FALSE for the first three entries that contain key-value pointers (424a-424c) in the fourth row (422) of the primary table (420). In contrast, this field would be set to 1 or TRUE in the last entry in that row (422) since that entry points to the overflow row (430a) in the secondary table.

The Tag field (704), ByteLoc field (700) and NumPages field (702) do not meaningfully change in this example if the SecondaryTable field (706) is set to 1 or TRUE; those fields include an upper 16 bit key hash, the pointer to the overflow row in the secondary table and the length (e.g., in pages) of that overflow row, respectively.

The Invalid field (708) is a 1-bit field that indicates if the entry is invalid (e.g., contains invalid information that is ready to be garbage collected) vs. valid (e.g., contains current, valid information which should not be garbage collected or otherwise overwritten). For example, if this field is set to 1 or TRUE then during a read operation, the distributed caching layer knows to ignore the other fields (e.g., it will not attempt to do a comparison against the Tag field (704) during a read) because it knows that entry is invalid but if this field is set to 0 or FALSE then it knows the entry and information contained therein is valid (e.g., it will attempt to do a comparison against the Tag field (704) during a read).

As shown here, in some embodiments, selecting one of the plurality of rows in the extensible primary table (e.g., at step 504 in FIG. 5 during a write operation and/or at step 602 in FIG. 6 during a read operation) further includes using a first subsequence of bits, having a value, from the key hash to select a corresponding one of the plurality of rows in the extensible primary table that corresponds to the value of the first subsequence of bits and in the event the link to the (stored) key-value pair is stored in the selected row (e.g., at step 504 in FIG. 5 and/or at step 604 in FIG. 6), the selected row further includes a second subsequence of bits from the key hash and excludes the first subsequence of bits. For example, in FIG. 4, the three lowest bits (e.g., one example of a first subsequence of bits) from key hash 11 (404) are used to select the fourth row (422) in the primary table (420) and in FIG. 7A, the remaining bits from the key hash (e.g., one example of a second subsequence of bits) are stored as the tag (704) but the three lowest bits are not stored therein.

Figure 7B:
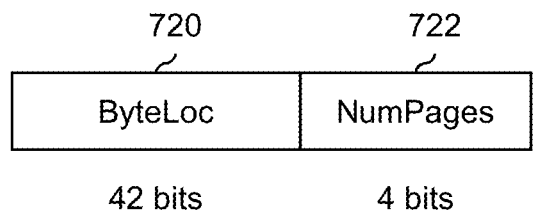
FIG. 7B is a diagram illustrating a first embodiment of the format of an entry in a secondary table.

FIG. 7B is a diagram illustrating a first embodiment of the format of an entry in a secondary table. In FIG. 4, for example, the two entries in the overflow row (430a/430b) may be implemented as shown. In this example, the ByteLoc field (720) and the NumPages field (722) have the same bit lengths and functions described above in FIG. 5A.

Using FIG. 4 to illustrate how a read is performed using this format, the distributed caching layer first checks the key-value pair stored in the overflow row to determine if the key stored therein matches the key it is looking for (e.g., examines the key in key-value pair 11 (432*a*) in the overflow row at the earlier point in time (430*a*) or key-value pair 15 (436) in the overflow row at the later point in time (430*b*)). If so, the value stored there is returned. If the keys do not match, then the distributed caching layer accesses the first entry in the overflow row and accesses the pointer specified in the ByteLoc field (720) and the number of pages specified in the NumPages field (722). A comparison of the key read back and the desired key is then performed. If there is a match, the value read back is retuned. Otherwise, the next entry in the overflow row is obtained and a read is performed at the pointer in the next ByteLoc field (720) and the number of pages specified in the next NumPages field (722) and the process repeats.

In this example, a shorter format is shown (e.g., compared to the longer format described next) which may require more reads or accesses to in order to return the correct value during a read. This tradeoff may be acceptable in applications where storage limitations are more of a concern.

Figure 7C:
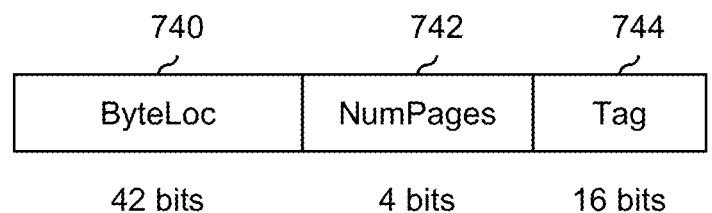
FIG. 7C is a diagram illustrating a second embodiment of the format of an entry in a primary table.

FIG. 7C is a diagram illustrating a second embodiment of the format of an entry in a primary table. In FIG. 4, for example, the two entries in the overflow row (430*a* or 430*b*) may be implemented as shown. In this example, the format includes a 42-bit ByteLoc field (740), a 4-bit NumPages field (742), and a 16-bit Tag field (744) with the interpretations and/or usage described above.

As described above, in some embodiments the distributed caching layer always checks the key-value pair stored in the overflow row first (e.g., examines the key in key-value pair 11 (432*a*) in the overflow row at the earlier point in time (430*a*) or key-value pair 15 (436) in the overflow row at the later point in time (430*b*)). If the desired key is not stored therein, the first entry in the overflow is obtained and the upper bits of the key hash stored in the Tag field (744) are compared against the upper bits of the desired key hash. If there is a match, then the pointer location stored in the ByteLoc field (740) is read (including the number of pages specified in the NumPages field (742)) and the value obtained from reading the key-value pair is returned or otherwise output to conclude the read. If the value in the Tag field (744) does not match those of the desired key hash, the next entry in the overflow row is examined (it is noted that the read of the overflow row returns both entries and so another read does not need to be performed at this time).

In this example, a longer format is used in which fewer reads are performed compared to the previous example. As such, this format may be more desirable in applications where I/O resources (e.g., performing a read) are more valuable or scarce than storage resources (e.g., storing more overhead information).

As shown here, in some embodiments, selecting one of the plurality of rows in the extensible primary table (e.g., at step 504 in FIG. 5 during a write operation and/or at step 602 in FIG. 6 during a read operation) further includes using a first subsequence of bits, having a value, from the key hash to select a corresponding one of the plurality of rows in the extensible primary table that corresponds to the value of the first subsequence of bits and in the event the link to the (stored) key-value pair is stored in the overflow row in the secondary table (e.g., at step 504 in FIG. 5 and/or at step 604 in FIG. 6), the overflow row in the secondary table further includes a second subsequence of bits from the key hash and excludes the first subsequence of bits.

For example, in FIG. 4, the three lowest bits (e.g., one example of a first subsequence of bits) from key hash 11 (404) are used to select the fourth row (422) in the primary table (420) and any stored tags (e.g., 704) stored in that row would be compared against the desired tag or subsequence of bits to determine if the selected row includes the pointer, or if the overflow row should be accessed and checked.

In some embodiments, key-value pairs are stored in different caches in the distributed storage system based (at least in part) on a frequency of access (e.g., where the "hotter" the key-value pair, the more frequently the key-value pair is expected to be accessed). The following figure shows an example of this.

Figure 8:
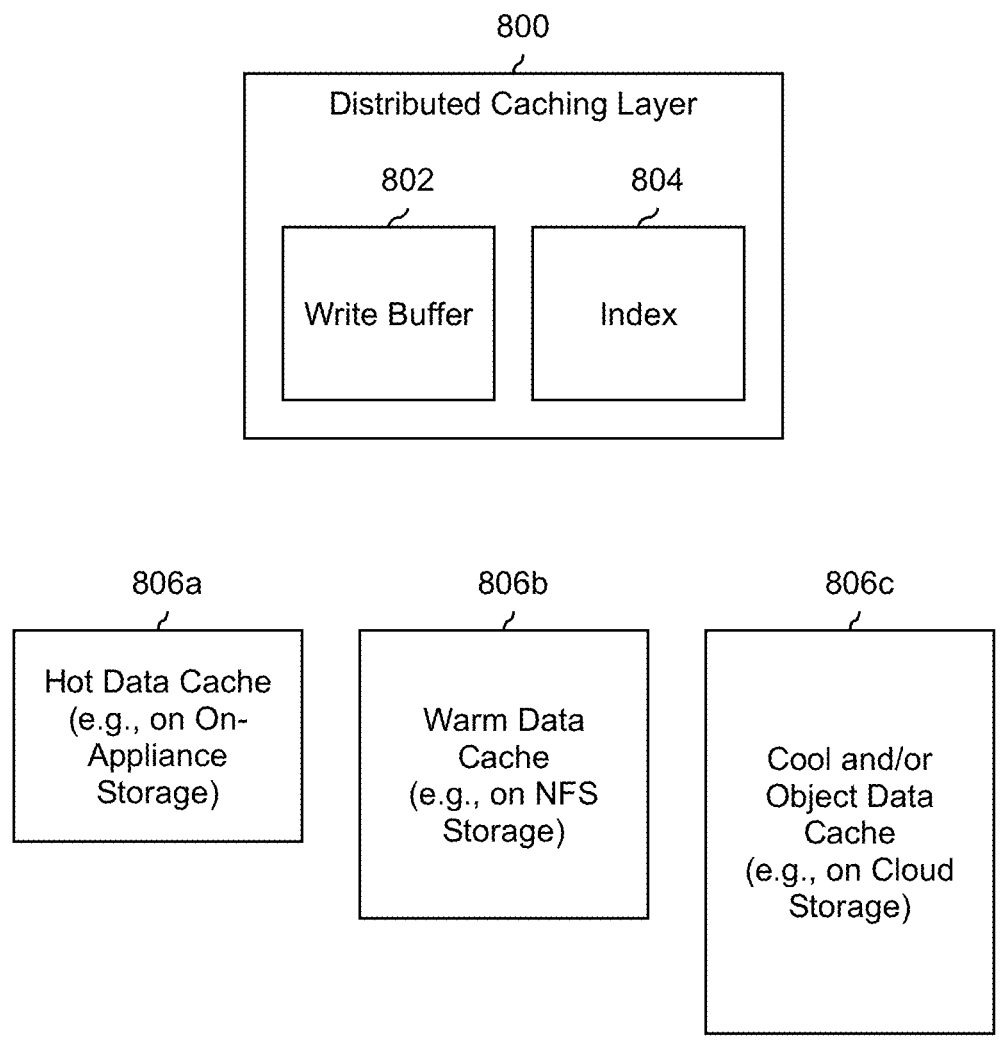
FIG. 8 is a diagram illustrating an embodiment of caches that are used to store key-value pairs based at least in part on an access frequency.

FIG. 8 is a diagram illustrating an embodiment of caches that are used to store key-value pairs based at least in part on an access frequency. In this example, there are three caches: a hot data cache (806*a*), a warm data cache (806*b*), and a cool and/or object data cache (806*c*) which in this example are located on on-appliance storage, NFS storage, and cloud storage, respectively. Data of similar access frequency (e.g., write frequency) is grouped together in the appropriate cache to maximize the cache hit rate and also minimize the compaction cost. For example, key-value pairs with the highest write frequency are stored in the hot data cache (806*a*), key-value pairs with the next highest write frequencies are stored in the warm data cache (806*b*), and key-value pairs that are written most infrequently are stored in the cool and/or object data cache (806*c*). In some embodiments, an application provides metadata with each key-value pair that that metadata is used to select the appropriate cache.

The distributed caching layer (800) includes a write buffer (802) which is used to aggregate together small(er) key-value pairs so that they can be written to the appropriate cache as a large sequential write to maximize throughput.

The caches (806*a*-806*c*) are implemented in this example as FIFOs (e.g., circular buffers). Incoming data from the distributed caching layer (800) is written to one end of the FIFO (e.g., the tail of the FIFO) and compaction (e.g., removing invalid or overwritten key-value pairs from a particular cache to free up the space) is done from the other end of FIFO (e.g., the head of the FIFO).

In some embodiments, the write buffer's flush location(s) is/are pre-allocated so that a primary table can be updated as key-value pairs are written to the write buffer (802). That is, the final destination of a key-value pair is known ahead of time so that the index (804) can be updated with the pointer to or location of a key-value pair's storage location, even if the key-value pair is currently in the write buffer (802).

To compact one of the caches (806*a*-806*c*), the head of the FIFO is read and the full key is obtained. The index (804) is consulted to determine if any of the entries in the primary table or secondary table (if any) are still pointing to the physical location being checked (e.g., at the head of the FIFO). If there is still a pointer in the index to that storage location, the entire key-value pair is rewritten to the tail of that FIFO (or, alternatively, to the tail of a different FIFO if the write frequency has changed) and the index is updated to point to the new location (e.g., at the tail of the FIFO). If the relevant part of the index has changed since the start of compaction (e.g., because of a new write while compaction was in progress), then the index update is discarded. If there is no pointer in the index to that storage location, the key and value are discarded.

Returning briefly to FIG. 4, in high-performance applications, it may be desirable to have multiple threads and/or processors accessing the index (410) at the same time. To ensure the accuracy and/or properness of the information stored in the index, it may be desirable to use a locking scheme for the index. The following figures describe some example implementations of a distributed locking scheme that offer better performance than a single, global lock.

Figure 9A:
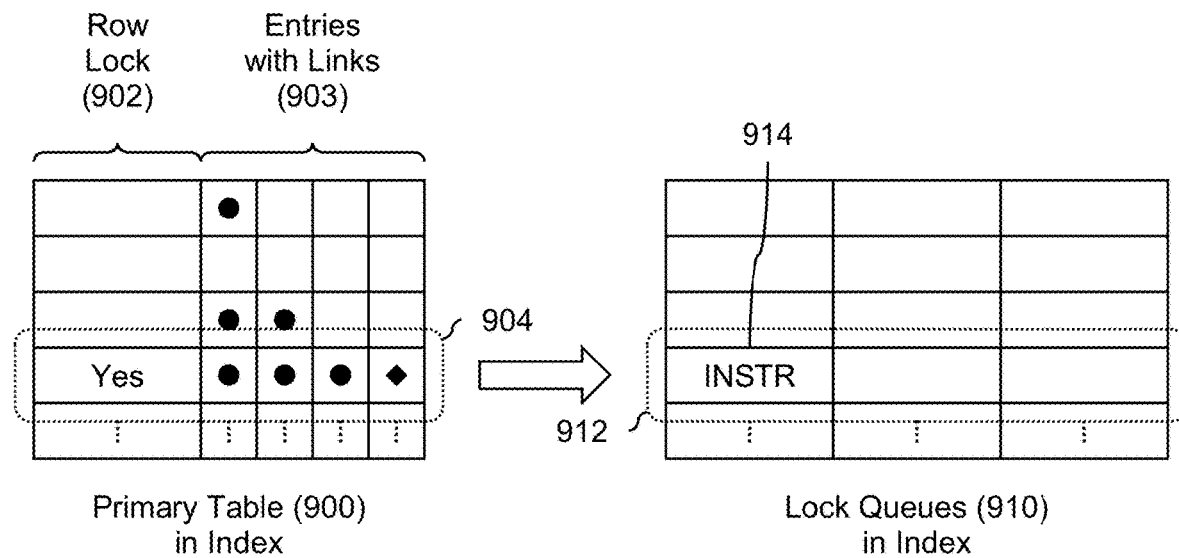
FIG. 9A is a diagram illustrating an embodiment of a primary table and lock queues that are associated with a distributed locking scheme.

FIG. 9A is a diagram illustrating an embodiment of a primary table and lock queues that are associated with a distributed locking scheme. In the example shown, a plurality of locks permits a plurality of workers to simultaneously perform read or write instructions which require access to the index. More specifically, in this example, each row in the primary table (900) in the index is able to be locked so that if there are N rows there are N locks. In this example, the leftmost column (902) in the primary table (900) is used to indicate whether a corresponding row is locked or not; the four columns on the right (903) are entries with links to stored key-value pairs or links to overflow rows in secondary tables (not shown to preserve readability), similar to the primary table (420) described in FIG. 4.

In this example, the fourth row (904) in the primary table (900) is locked. Suppose that a worker receives an instruction (e.g., in a request queue). As described above, the worker generates a key hash from the key that is associated with the instruction and uses at least some portion of the key hash to select one of the rows in the primary table. For the purposes of this example, suppose that the (relevant parts of the) key hash map to the fourth row (904) in the primary table.

After accessing the fourth row (904) in the primary table (900), the worker will determine that the row is locked, indicated by the corresponding entry in the row lock (902). As such, the worker stores information associated with the instruction (914) in the fourth lock queue (912), which corresponds to the locked fourth row (904). For example, the stored instruction information (914) may be some instruction identifier, link, and/or reference which permits the stored instruction to be resumed or otherwise performed when the prior instruction (and any intervening instructions pending in the relevant lock queue) is completed. To prevent collisions between workers at the lock queues, in some embodiments, the lock queues are updated atomically by the workers using a compare-and-swap primitive. After placing the instruction into the appropriate lock queue, in some embodiments, the worker moves on to process other instructions or suspends itself if there are no other instructions.

When the command handler has completed the prior instruction (e.g., which caused the fourth row in the primary table to be locked), the command handler will check the fourth lock queue (912) and find the stored instruction (914). The command handler will then (at least in this example) send a wakeup notification to a sleeping or suspending worker so that the stored instruction can be performed.

A more naive approach may be to use a single, global lock that locks the entire index, which would severely impact performance in a system with multiple workers. With this distributed locking approach, only the fourth row in the primary table is locked, permitting the workers to work on instructions associated with the other (i.e., unlocked) rows in the primary table.

In some embodiments, there are few locks compared to the number of rows in the primary table. The following figure describes one example for how this may be implemented.

Figure 9B:
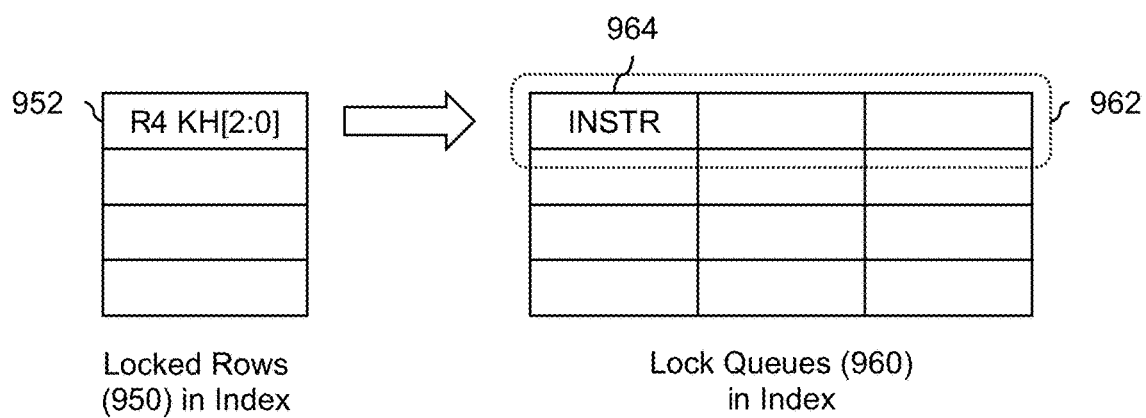
FIG. 9B is a diagram illustrating an embodiment of locked tags and lock queues that are associated with a distributed locking scheme.

FIG. 9B is a diagram illustrating an embodiment of locked tags and lock queues that are associated with a distributed locking scheme. In this example, there are four locks but more than four rows in the primary table. To keep track of which rows in the primary table are locked at any particular time, identifying information associated with the locked rows (950) are stored in the index. In this example, locked rows are identified by the three lowest bits of their key hash (referred to in the figure as KH[2:0]), which is the same value that is used to select the appropriate row in the primary table. A worker with an instruction would generate a key hash, extract the three lowest bits from the key hash, and check this value against the stored information about the locked rows (950). In this example, the worker detects that the three lowest bits of the key hash of the fourth row (i.e., R4 KH[2:0] (952)) is one of the locked rows (950), indicating that that fourth row in the primary table is locked. The worker would then store information associated with the instruction (964) in a corresponding lock queue (962), which in this example is the first lock queue in the collection of four lock queues (960).

In one example where a read instruction is performed where there is a plurality of distributed locks, a read request or instruction is received and a key hash is generated from the key. The appropriate row in the primary table is read or otherwise obtained based on (at least some portion of) the key hash. If the invalid field is set to TRUE (see, e.g., the Invalid field (708) in FIG. 7A), then a "not found" value is returned. If the invalid field is set to FALSE, then the worker checks to see if that row in the primary table is locked (e.g., depending on how locking is performed or otherwise recorded). If the row is locked using one of the distributed locks, then the read request or instruction is placed in the appropriate or corresponding lock queue and the worker processes a next instruction (if any and permitted), or suspends itself and waits for a wakeup notification. Once the worker is notified that the queued read instruction can be performed, the worker checks the primary table buckets for the desired tag (see, e.g., the Tag field (704) in FIG. 7A). If one of the stored tags matches the desired tag, the stored key-value pair is read from storage using the stored link or pointer (see, e.g., the ByteLoc field (700) in FIG. 7A). If none of the tags in that row of the primary table match the desired tag and if a secondary table exists (see, e.g., the SecondaryTable field (706) in FIG. 7A), the secondary table is read from the pointer location to the secondary table. From the information stored in the secondary table, stored full key(s) are compared against the (full) desired key and if there is a match then the corresponding value is output or otherwise returned. Otherwise (e.g., if the process is unable to find a matching key or a matching tag), a not-found indication or signal is returned.

In one example where a write instruction is performed where there are a plurality of distributed locks, a write request or instruction is received and a key hash is generated and used to select and read a row in a primary table, as described above. Lock checking is then performed (similar to above) to see if one of the locks is being used to lock the row of interest in the primary table. If the row is not locked or after waiting for the row to be unlocked and the write instruction to move to the top of the lock queue (if needed), the stored tags in the relevant row of the primary table are checked and if any of them match the desired tag, the appropriate or corresponding pointer or link is used to read the specified location. If there are no matching tags in that row of the primary table and there is a secondary table, the associated overflow row in the secondary table is accessed. A check of the stored (full) key(s) in the accessed overflow row of the secondary table is performed against the desired (full) key and if it is located, the older key-value pair is marked as invalid, and the new key-value pair is written to one of a plurality of storage locations in a distributed storage system (e.g., the tail of an appropriate FIFO on selected storage) and then the primary table and/or secondary table is/are updated as appropriate so that future reads with that key are directed to the newly stored key-value pair and not to the older key-value pair. In some cases the key has not been stored in the distributed storage system before, in which case (at least in this example) the new key-value pair is written to one of a plurality of storage locations in a distributed storage system (e.g., the tail of an appropriate FIFO on selected storage) and the primary table and/or secondary table is/are updated with a new entry for the new key. In this example, a read is performed as part of the write handling so that stored pointers (if any) can be located and updated and older stored key-value pairs with older values can be (flagged for) erasure and/or cleanup.

The following figure describes these examples more generally and/or formally in a flowchart.

Figure 10:
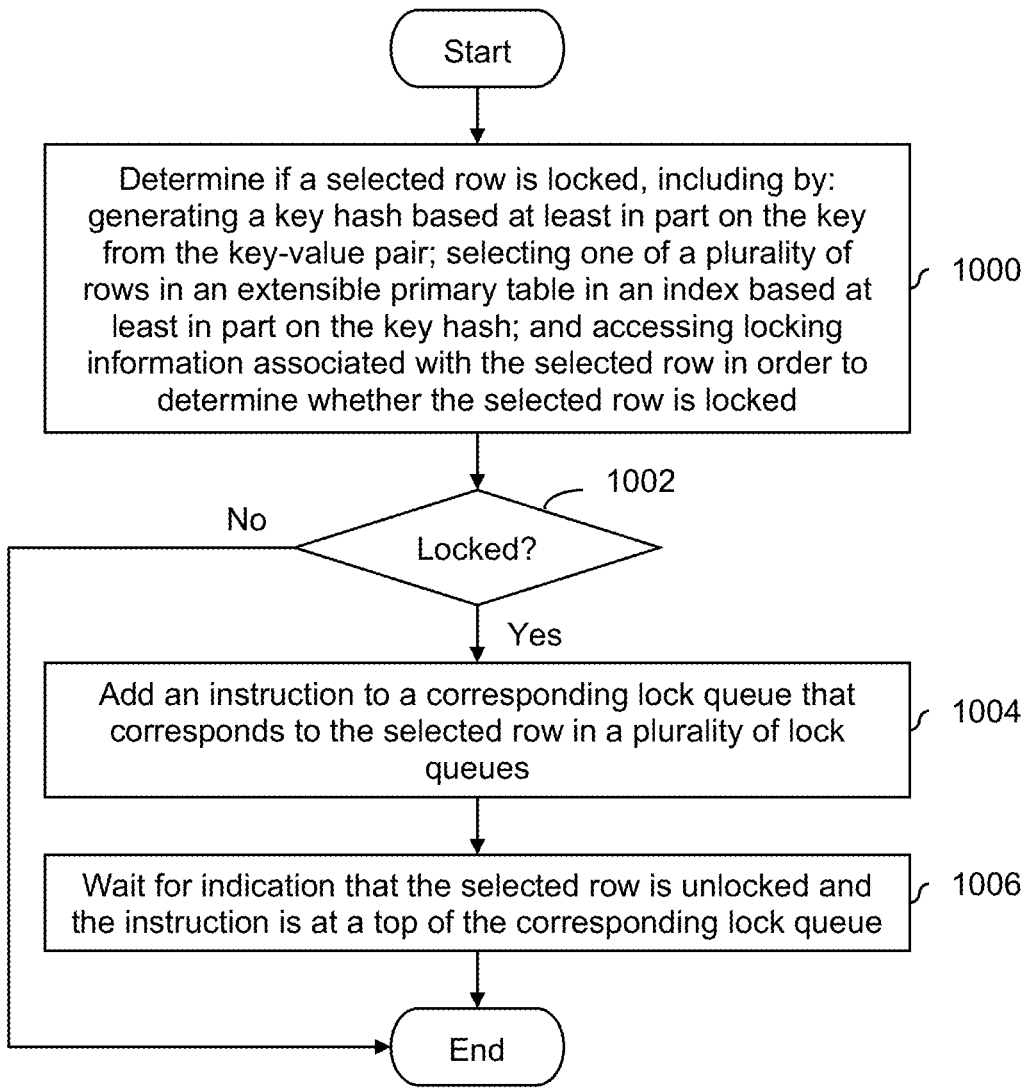
FIG. 10 is a flowchart illustrating an embodiment of a process to check for a lock where there is a plurality of distributed locks.

FIG. 10 is a flowchart illustrating an embodiment of a process to check for a lock where there is a plurality of distributed locks. In the context of FIG. 5, the lock checking process of FIG. 10 may be performed after step 500 (i.e., receiving a write instruction) but before steps 502 or 504. In the context of FIG. 6, the lock-checking process of FIG. 10 may be performed after step 600 (i.e., receiving a read instruction) and before steps 602, 604, or 606. In some embodiments, the process of FIG. 10 is performed by a worker associated with a distributed caching layer (e.g., where there are multiple workers and each one performs this lock checking process).

At 1000, it is determined if a selected row is locked, including by: generating a key hash based at least in part on the key from the key-value pair; selecting one of a plurality of rows in an extensible primary table in an index based at least in part on the key hash; and accessing locking information associated with the selected row in order to determine whether the selected row is locked. In the example of FIG. 9A, for example, the relevant locking information is stored in each row of the primary table and by accessing or otherwise reading a given row in the primary table, the corresponding locking information for that row is obtained (see, e.g., row lock (902)). In the example of FIG. 9B, the locked rows (950) store the lowest three bits of the key hash for those rows that are locked.

If it is not locked at 1002, then the process ends. Otherwise, if it is locked at 1002, an instruction (e.g., the write instruction received at step 500 in FIG. 5 or the read instruction received at step 600 in FIG. 6) is added to a corresponding lock queue that corresponds to the selected row in a plurality of lock queues at 1004. For example, an instruction is added to the fourth lock queue (912) in FIG. 9A and in FIG. 9B an instruction is added to the first lock queue (962).

At 1006, there is a wait for an indication that the selected row is unlocked and the instruction is at a top of the corresponding lock queue. For example, during a wait, a worker may move on to process other requests or instructions (e.g., if permitted/any) or suspend itself if there are no other requests or instructions while it waits for an indication (e.g., from a read/write handler) that the selected row is unlocked and the instruction is at a top of the corresponding lock queue (i.e., the stored instruction can now proceed).

With the lock checking process concluded, the system may then store a key-value pair (e.g., step 502 in FIG. 5) and/or store a link to the stored key-value pair (e.g., step 504 in FIG. 5) if performing a write instruction, or may determine whether a link to a stored key-value pair is stored in an extensible primary table in an index (e.g., step 602 in FIG. 6), obtain the value associated with the stored key-value pair (e.g., step 604 in FIG. 6), and/or output the value (e.g., step 606 in FIG. 6).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface configured to communicate with an application and a plurality of types of storage in a distributed storage system; and
a processor coupled to the communication interface and configured to:
receive, from the application, a write instruction that includes a key-value pair that in turn includes a key and value;
store the key-value pair in a selected one of the plurality of types of storage in the distributed storage system, wherein the selected type of storage in the distributed storage system is selected based at least in part on a size or access frequency of the key-value pair; and
store a link to the stored key-value pair, including by:
generating a key hash based at least in part on the key from the key-value pair;
selecting one of a plurality of rows in an extensible primary table in an index based at least in part on the key hash;
in the event it is determined that there is sufficient space in the selected row, storing, in the selected row, the link to the stored key-value pair; and
in the event it is determined that there is insufficient space in the selected row, storing the key-value pair in an overflow row in a secondary table.

2. The system recited in claim 1, wherein selecting one of the plurality of rows in the extensible primary table further includes using a first subsequence of bits, having a value, from the key hash to select a corresponding one of the plurality of rows in the extensible primary table that corresponds to the value of the first subsequence of bits.

3. The system recited in claim 1, wherein it is determined that there is insufficient space in the selected row in the event there is only one remaining entry in the selected row, wherein a second pointer to the overflow row in the secondary table is stored in said only one remaining entry in the selected row.

4. The system recited in claim 1, wherein:
selecting one of the plurality of rows in the extensible primary table further includes using a first subsequence of bits, having a value, from the key hash to select a corresponding one of the plurality of rows in the extensible primary table that corresponds to the value of the first subsequence of bits; and
in the event the link to the key-value pair is stored in the selected row, the selected row further includes a second subsequence of bits from the key hash and excludes the first subsequence of bits.

5. The system recited in claim 1, wherein:
selecting one of the plurality of rows in the extensible primary table further includes using a first subsequence of bits, having a value, from the key hash to select a corresponding one of the plurality of rows in the extensible primary table that corresponds to the value of the first subsequence of bits; and
in the event there is not sufficient space in the selected row, storing the value further includes storing a second subsequence of bits from the key hash in the overflow row without storing the first subsequence of bits in the overflow row.

6. A system, comprising:
a communication interface configured to communicate with an application and a plurality of types of storage in a distributed storage system; and
a processor coupled to the communication interface and configured to:
  receive, from the application, a read instruction that includes a key associated with a stored key-value pair;
  determine whether a link to the stored key-value pair is stored in an extensible primary table in an index, including by:
    generating a key hash based at least in part on the key associated with the stored key-value pair; and
    selecting one of a plurality of rows in the extensible primary table in the index based at least in part on the key hash;
  obtain a value associated with the stored key-value pair from a selected one of the plurality of types of storage in the distributed storage system, wherein:
    in the event it is determined that the link to the stored key-value pair is stored in the selected row, obtaining the value associated with the stored key-value pair including using the link to the stored key-value pair stored in the selected row;
    in the event it is determined that the link to the stored key-value pair is not stored in the selected row, obtaining the value associated with the stored key-value pair including obtaining an overflow row in a secondary table; and
    the selected type of storage in the distributed storage system is selected during a write to store the stored key-value pair based at least in part on a size or access frequency of the stored key-value pair; and
  output the value associated with the stored key-value pair.

7. The system recited in claim 6, wherein selecting one of the plurality of rows in the extensible primary table further includes using a first subsequence of bits, having a value, from the key hash to select a corresponding one of the plurality of rows in the extensible primary table that corresponds to the value of the first subsequence of bits.

8. The system recited in claim 6, wherein:
selecting one of the plurality of rows in the extensible primary table further includes using a first subsequence of bits, having a value, from the key hash to select a corresponding one of the plurality of rows in the extensible primary table that corresponds to the value of the first subsequence of bits; and
in the event the link to the stored key-value pair is stored in the selected row, the selected row further includes a second subsequence of bits from the key hash and excludes the first subsequence of bits.

9. The system recited in claim 6, wherein:
selecting one of the plurality of rows in the extensible primary table further includes using a first subsequence of bits, having a value, from the key hash to select a corresponding one of the plurality of rows in the extensible primary table that corresponds to the value of the first subsequence of bits; and
determining whether the overflow row in the secondary table includes the value further includes comparing a stored second subsequence of bits against a second subsequence of bits from the key hash, wherein the stored second subsequence is stored in the overflow row without the first subsequence of bits.

10. A method, comprising:
communicating with an application and a plurality of types of storage in a distributed storage system;
receiving, from the application, a write instruction that includes a key-value pair that in turn includes a key and value;
storing the key-value pair in a selected one of the plurality of types of storage in the distributed storage system using a processor, wherein the selected type of storage in the distributed storage system is selected based at least in part on a size or access frequency of the key-value pair; and
storing a link to the stored key-value pair using the processor, including by:
  using the processor to generate a key hash based at least in part on the key from the key-value pair;
  using the processor to select one of a plurality of rows in an extensible primary table in an index based at least in part on the key hash;
  in the event it is determined that there is sufficient space in the selected row, storing, in the selected row, the link to the stored key-value pair; and
  in the event it is determined that there is insufficient space in the selected row, storing the key-value pair in an overflow row in a secondary table.

11. The method recited in claim 10, wherein selecting one of the plurality of rows in the extensible primary table further includes using a first subsequence of bits, having a value, from the key hash to select a corresponding one of the plurality of rows in the extensible primary table that corresponds to the value of the first subsequence of bits.

12. The method recited in claim 10, wherein it is determined that there is insufficient space in the selected row in the event there is only one remaining entry in the selected row, wherein a second pointer to the overflow row in the secondary table is stored in said only one remaining entry in the selected row.

13. The method recited in claim 10, wherein:
selecting one of the plurality of rows in the extensible primary table further includes using a first subsequence of bits, having a value, from the key hash to select a corresponding one of the plurality of rows in the extensible primary table that corresponds to the value of the first subsequence of bits; and
in the event the link to the key-value pair is stored in the selected row, the selected row further includes a second subsequence of bits from the key hash and excludes the first subsequence of bits.

14. The method recited in claim 10, wherein:
selecting one of the plurality of rows in the extensible primary table further includes using a first subsequence of bits, having a value, from the key hash to select a corresponding one of the plurality of rows in the extensible primary table that corresponds to the value of the first subsequence of bits; and
in the event there is not sufficient space in the selected row, storing the value further includes storing a second subsequence of bits from the key hash in the overflow row without storing the first subsequence of bits in the overflow row.

* * * * *